(12) United States Patent
O'Connor (10) Patent No.: US 9,677,641 B2
(45) Date of Patent: Jun. 13, 2017

(54) MAGNETO RHEOLOGICAL FIXTURE DAMPING SYSTEM

(71) Applicant: The Boeing Company, Chicago, IL (US)

(72) Inventor: Alexander P. O'Connor, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 130 days.

(21) Appl. No.: 14/749,842

(22) Filed: Jun. 25, 2015

(65) Prior Publication Data

US 2016/0377143 A1  Dec. 29, 2016

(51) Int. Cl.
*F16F 9/53* (2006.01)
*B23Q 3/10* (2006.01)
*B23Q 11/00* (2006.01)

(52) U.S. Cl.
CPC .............. *F16F 9/535* (2013.01); *B23Q 3/103* (2013.01); *B23Q 11/0032* (2013.01)

(58) Field of Classification Search
CPC ....... F16F 9/535; B23Q 3/103; B23Q 11/0032
See application file for complete search history.

(56) References Cited

U.S. PATENT DOCUMENTS

| | | | | |
|---|---|---|---|---|
| 6,311,810 | B1 * | 11/2001 | Hopkins | F16F 9/535 188/267.2 |
| 2013/0243526 | A1 * | 9/2013 | Williamson | F16F 15/02 404/133.1 |

OTHER PUBLICATIONS

Gulam Hohd Sayeed Ahmed, et al. "Experimental Investigation of Magneto Rheological Damping Effect of Surface Roughness of Work Piece during End Milling Process" International Journal of Precision Engineering and Manufacturing vol. 13, No. 6, pp. 835-844. Jun. 2012.
P. Sam Paul, A. S. Varadarajan. "Effect of magneto rheological damper on tool vibration during hard turning" Frontiers of Mechanical Engineering. 7(4): 410-416, 2012.

(Continued)

*Primary Examiner* — John C Hong
(74) *Attorney, Agent, or Firm* — Miller, Matthias & Hull LLP (57) ABSTRACT

A vibration damping system for machining parts uses magneto rheological radial squeeze film damper technology to reduce part vibration, enhance tool lifecycles, and to improve part surface finish. In the described embodiment, the damping system includes a pair of damping cylinders affixed to a machine tool fixture, each cylinder containing a solid core concentrically situated within an internal sleeve portion of the cylinder. Rheological fluid contained within a radial space between the core and sleeve defines a radial squeeze channel for the fluid. Fluid stiffness is controlled in real time by varying an electric current to modulate a magnetic field passing through the fluid to dampen vibrations in accordance with at least one predetermined algorithm. As material is removed from the part during machining, the fluid damping characteristics are actively managed by a machine tool controller as a function of a combination of dynamically changing and predetermined algorithmic inputs.

20 Claims, 6 Drawing Sheets

(56) References Cited

OTHER PUBLICATIONS

Avinasha B, Shyam Sundar Sb, K V Gangadharana; "Experimental study of damping characteristics of air, silicon oil, magneto rheological fluid on twin tube damper" International Conference on Advances in Manufacturing and Materials Engineering, AMME 2014. Procedia Materials Science 5 ( 2014 ) 2258-2262.

G.M Sayeed Ahmed, P. Ravinder Reddy. "Experimental evaluation of critical axial depth of cut with magneto rheological damping in end milling process" International Journal of Scientific and Research Publications, vol. 2, Issue 8, Aug. 2012, ISSN 2250-3153.

G.M. Sayeed Ahmed, P. Ravinder Reddy, N. Seetharamaiah. "FEA Based Modeling of Magneto Rheological Damper to Control Vibrations during Machining" 3rd International Conference on Materials Processing and Characterisation (ICMPC 2014); Procedia Materials Science 6 ( 2014 ) 1271-1284.

H. R. Lee and K. W. Min. "Reducing Acceleration Response of a SDOF Structure with a Bi-directional Liquid Damper" The Twelfth East Asia-Pacific Conference on Structural Engineering and Construction; Procedia Engineering 14 (2011) 1237-1244.

X.C. Guana, P.F. Guoa, J.P. Oub. "Modeling and Analyzing of Hysteresis Behavior of Magneto Rheological Dampers" The Twelfth East Asia-Pacific Conference on Structural Engineering and Construction. Procedia Engineering 14 (2011) 2756-2764.

Sadak Ali Khana, A.SureshbN.SeethaRamaiah. "Principles, Characteristics and Applications of Magneto Rheological Fluid Damper in Flow and Shear Mode" 3rd International Conference on Materials Processing and Characterisation (ICMPC 2014). Procedia Materials Science 6 ( 2014 ) 1547-1556.

\* cited by examiner

MAGNETO RHEOLOGICAL FIXTURE DAMPING SYSTEM

FIELD

The present disclosure relates generally to damping vibrations induced via tool machining of a workpiece, and more specifically to magneto rheological damping fixtures configured to provide real-time vibration control.

BACKGROUND

Metal machining involves vibratory forces that result from interactions of a cutting tool with a workpiece or part to be machine finished. Vibrations induced by such interactions create adverse effects on cutting tool life cycles, are deleterious to workpiece or part surface quality, and may produce hazardous noise pollution. Magneto rheological technology is known to reduce cutting tool vibration and associated tool chatter during machining processes involving workpieces held within fixtures. Known magneto rheological damping systems utilize electric currents to modify magnetic fields to produce variable stiffness of rheological fluids for damping effect. As such, rheological fluids are able to effectively and dynamically shift frequency ranges in-situ during machining of workpieces by automatically varying viscosities of a particular rheological damping fluid being used.

Although sophistication levels of damping systems have continued to advance, there remain certain deficiencies and/or limitations. For example, some damping systems require the placement of weights on workpieces or machine tool structures during the machining process. Since the weights must be physically removed, replaced, and/or shifted about as the machining progresses, workers are required to enter and exit the machine environment.

In addition, most magneto rheological damping systems involve only linear damping capabilities, thus providing damping along a single axis, such as only along either a lateral or a side-to-side axis. Further, since volume or mass of a part or workpiece is reduced during its actual machining, levels of stiffness of the rheological fluid are not adjusted in real time to fully accommodate changing workpiece vibration characteristics.

It is therefore desirable to provide improved magneto rheological fixture damping systems.

SUMMARY

In accordance with one aspect of the present disclosure, a modular machining fixture damping system uses rheological fluid to dampen vibrations during machining of a workpiece. The fixture damping system includes a plurality of radial squeeze film dampers containing magneto rheological fluid, which are configured to provide damping in at least two dimensions.

In accordance with another aspect of the present disclosure, a machine controller is configured to modulate the virtual density or dynamic stiffness of the magneto rheological fluid in accordance with a predetermined algorithm for providing real-time adjustments of a magnetic field therethrough via modulation of an electric current passing through one or more electromagnets.

In accordance with another aspect of the present disclosure, a machine tool controller utilizes the algorithm to modulate the magnetic field to control dynamic stiffness of the rheological fluid.

In accordance with yet another aspect of the present disclosure, the machine tool controller employs the algorithm to achieve a given dynamic stiffness of the rheological fluid as a function of reduction in mass of the workpiece during the machining process.

In accordance with a still further aspect of the present disclosure, the modular machining fixture damping system includes a modular machining fixture, a block for holding a workpiece, and a cradle for supporting the block, all integrated within a machining tombstone.

The features, functions, and advantages disclosed herein can be achieved independently in various embodiments or may be combined in yet other embodiments, the details of which may be better appreciated with reference to the following description and drawings.

It should be understood that the drawings are not to scale, and that the disclosed embodiments may be illustrated only schematically. It should be further appreciated that the following detailed description is only exemplary, and not intended to be limiting. As such, although the present disclosure is, for purposes of explanatory convenience, depicted and described in only illustrative embodiments, the disclosure may be implemented in numerous additional embodiments, and within or as part of various additional systems and environments not shown or described herein.

DETAILED DESCRIPTION

The following detailed description is intended to provide examples of both apparatus and methods for carrying out the disclosure. Actual scope of the disclosure is as defined by the appended claims.

Figure 1:
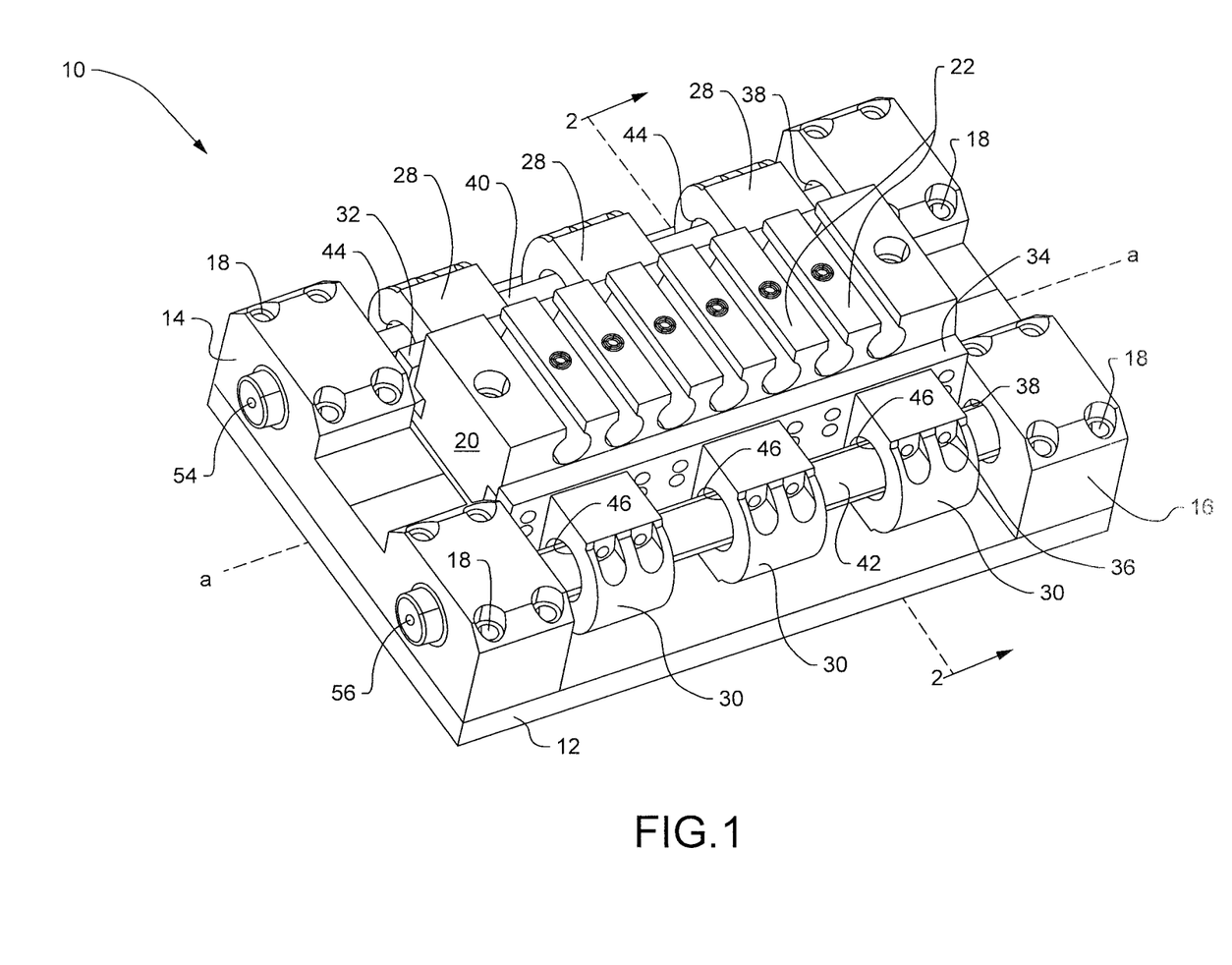
FIG. 1 is a perspective view of a modular machining fixture that may be used in the magneto rheological damping system of the present disclosure.

Referring initially to FIG. 1, a modular machining fixture 10 includes a rigid base 12, and a pair of end clamps 14, 16, spaced along a longitudinal axis "a-a". The end clamps 14, 16 are releasably secured to the base 12 by vertically disposed bolts 18. Situated on the base 12 between the end clamps 14, 16 is a dovetail block 20 configured for holding a workpiece (not shown in FIG. 1), as later described. The dovetail block 20 includes a plurality of spaced, laterally extending, dovetail surfaces 22 for supporting the workpiece, as will be appreciated by those skilled in the art. A plurality of side clamps 28 are secured on one side of the block 20 to a vertically or upstanding cradle wall 32, while a plurality of opposing side clamps 30 are secured to a similar opposite cradle wall 34. The side clamps 28, 30 are secured to the spaced cradle walls 32, 34, respectively, by laterally extending bolts 36 (shown only with respect to side clamps 30).

In the embodiment disclosed, a pair of laterally spaced elongated cylindrical magneto rheological dampers 40 and 42 pass through respective sets of apertures 44, 46 of respective side clamps 28 and 30, as shown, each of the dampers 40 and 42 having their ends supported within apertures 38 of end clamps 14 and 16. Each of the dampers 40, 42 includes an axially oriented threaded port 54, 56, respectively, for receiving magneto rheological fluid within the cylindrical dampers, as further described below.

Figure 2:
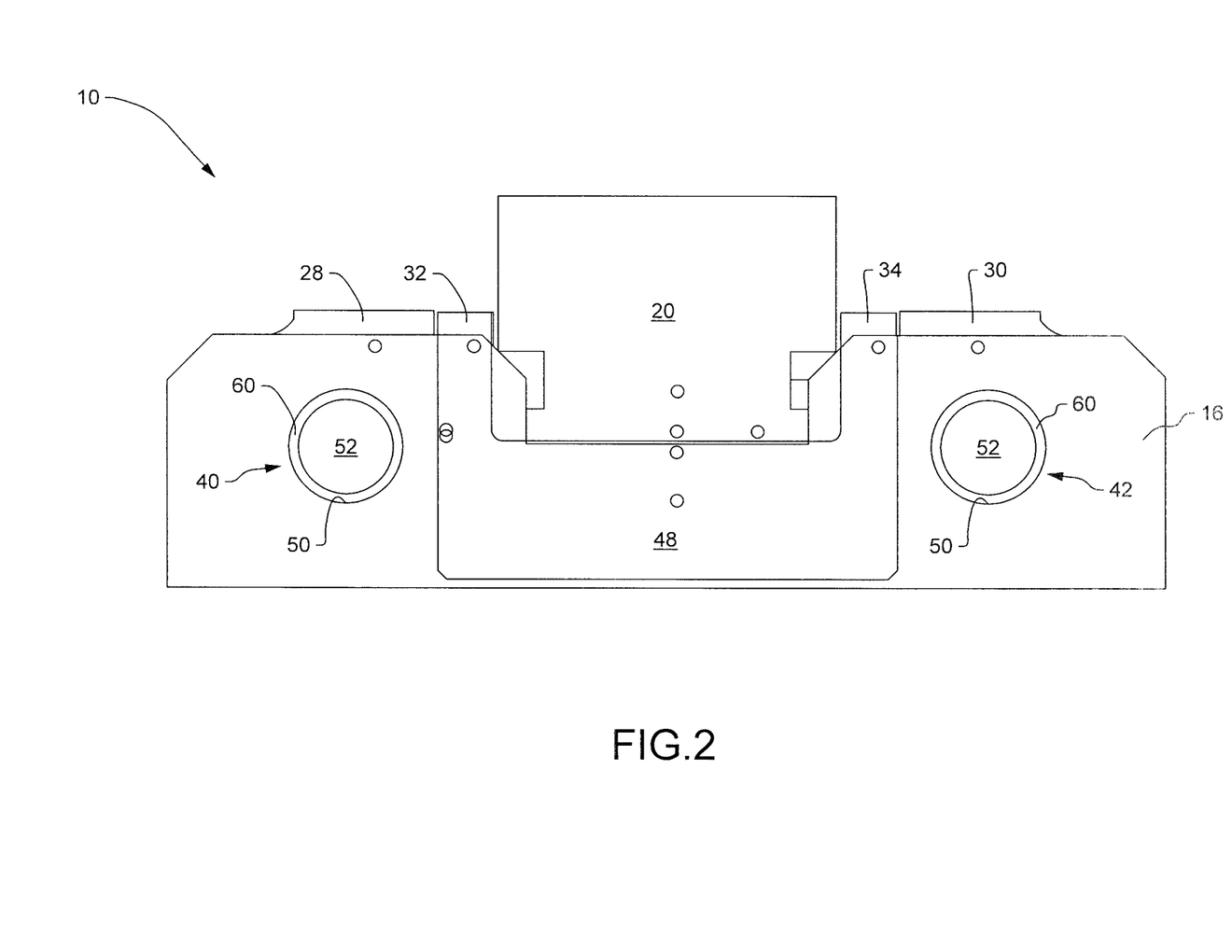
FIG. 2 is a cross-sectional view of the modular machining fixture of FIG. 1, taken along lines 2-2 of FIG. 1.

Referring now to FIG. 2, a cross-sectional view of the machining fixture 10 reveals each of the elongated cylindrical magneto rheological dampers 40, 42. Each damper 40, 42 includes an exterior cylindrical damper sleeve 50 that houses a solid metal core 52 configured to incorporate electromagnets (not shown) for reaction with a rheological fluid contained between the sleeve 50 and the core 52. A channel 60, defined by the radial space between the elements of sleeve 50 and core 52, contains a reactive rheological fluid which responds dynamically to changes in magnetic fields, as those skilled in the art will appreciate. To generate and modulate a magnetic field through the fluid, an electrical current may be applied between the sleeve 50 and the core 52 by connecting each to respective positive and ground electrical leads, the current then passing through the electromagnets of the core 52. Since the rheological fluids incorporate magnetic particles suspended in a carrier fluid, such as a type of oil, when the magnetic particles are subjected to a magnetic field, the fluid viscosity or stiffness will change as a function of magnetic field intensity, up to the point of becoming a viscoelastic solid at full magnetic saturation. Any discussion of specific characteristics of such magneto rheological fluids is, however, beyond the scope of this disclosure.

Continuing reference to FIG. 2, it will be noted that the dovetail block 20 is supported on a cradle base 48, and that each of the vertical cradle walls 32, 34 is integrally fixed to the cradle base 48, as shown. As noted, the side clamp 28 is secured to the vertical wall 32, while the side clamp 30 is secured to the vertical wall 34. As such, the side clamps may be configured to be adjustable for tuning bending moments of the dampers 40, 42 by virtue of the previously described laterally extending bolts 36 (FIG. 1), as those skilled in the art may appreciate.

Figures 3, 3A:
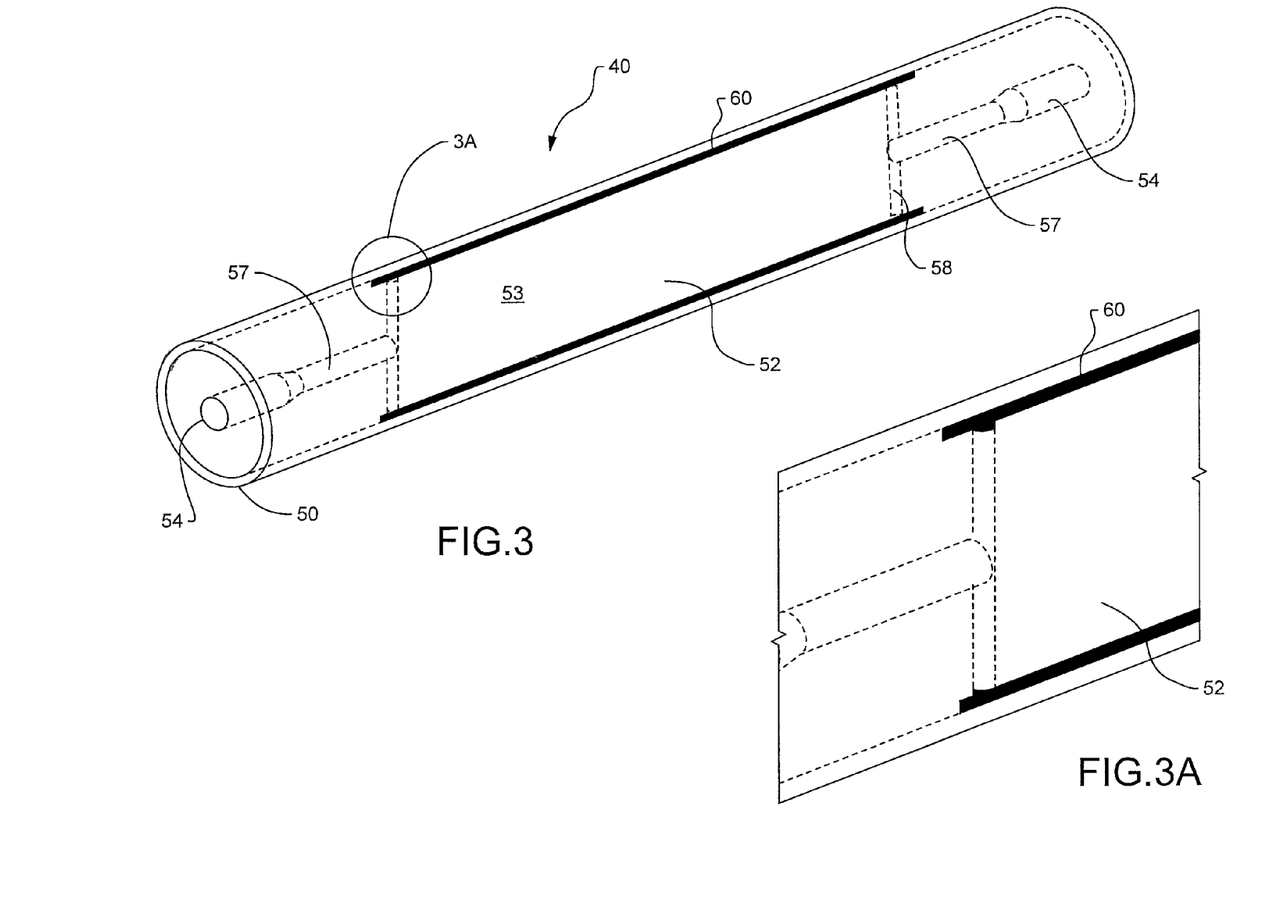
FIG. 3 is a combination perspective and cross-sectional view of a damper that may be used in the magneto rheological damping system of the present disclosure.
FIG. 3A is a cross-sectional, perspective view showing an enlarged portion of the damper shown in FIG. 3.

Referring now to FIG. 3, one of the dampers, damper 40 is shown in greater detail; the dampers 40, 42 are essentially identical, except for their relative positions, i.e., one is positioned on each side of the axis a-a. As earlier noted, each damper 40, 42 contains an exterior cylindrical sleeve 50 have threaded fluid ports in each end (FIG. 3). Each of the threaded ports 54, 56 communicates with an interior axial fluid port 57, which in turn communicates with a plurality (for example three) of radially oriented, interior fluid ports 58 collectively configured to supply magneto rheological fluid directly into the channel 60. The described porting arrangement can permit constant flow and/or exchanges of fluid in order to maintain consistent temperatures, to the extent that rising fluid temperatures may deleteriously affect density of the fluid and thus damping capability of the dampers 40, 42. Such described system of ports 54, 56, 57, and 58 may offer capability for real time transfers of fluid to and from a fluid cooling unit (not shown).

Continuing reference to FIG. 3, it will appreciated by those skilled in the art that the damper core 52 may be configured as an inner solid metal rod fitted within the outer sleeve 50, and that the various interior ports 54, 56, 57, and 58 will all enable the passage of magneto rheological fluid through the central core, formed as an inner rod, as shown and described. It will further be appreciated that the outer sleeve 50 and the damper core 52 may be press-fitted and welded together at their respective ends. As such, a central portion 53 of the fed damper core 52 may be of a reduced diameter to provide the channel 60 for containing magneto rheological fluid, as further described below.

Figure 4:
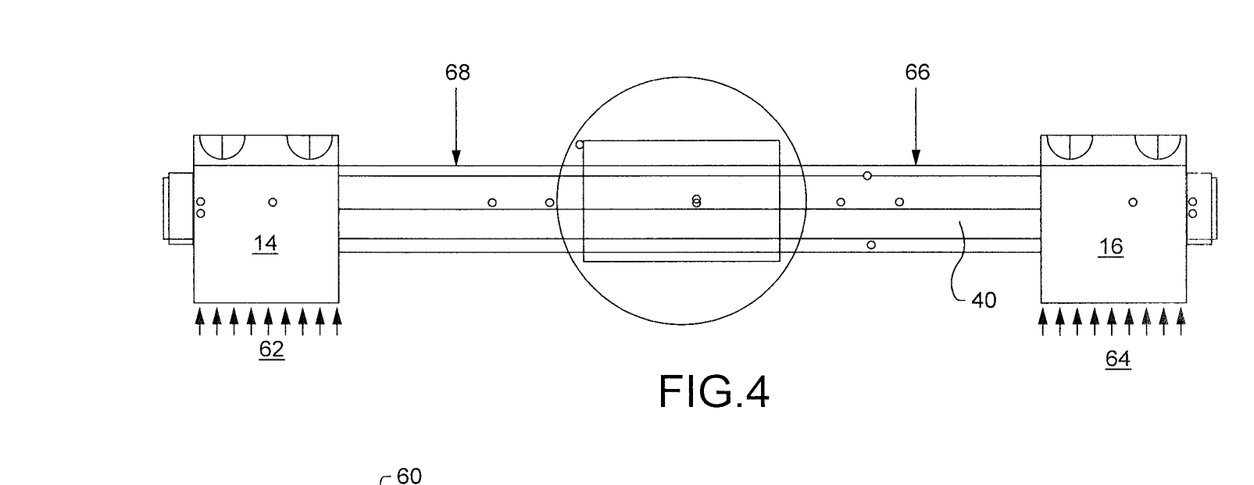
FIG. 4 is a top view of a portion of the modular machining fixture of FIGS. 1 and 2.
Figure 4A:
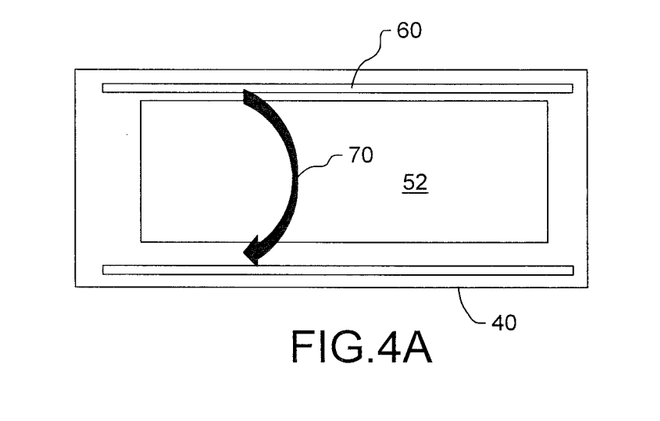
FIG. 4A is an enlarged inset portion of FIG. 4.

Referring now also to FIG. 4, a view of the end clamps 14, 16, includes the cylindrical magneto rheological damper 40 supported therebetween, but depicted without the side clamps 28. Those skilled in the art will appreciate that vibrations will be transferred from a workpiece (not shown) that is secured to the dovetail block 20 into the entire modular machining fixture 10, including the end clamps 14, 16, as well as into the side clamps 28, which have been removed for clarity of discussion. Thus, assuming for sake of simplicity that the loads on site clamps 28 can be represented by the loads on the end clamps 14, 16, it will be appreciated that any vibratory forces, shown as arrows 62, transmitted into the clamps 14, 16 will be reacted by equal and opposite countervailing forces 66, 68 on the damper 40. As such, the damper 40 will tend to vibrate with the workpiece. The magneto rheological fluid can however be controlled via modulation of an electrically induced magnetic field to react to reduce and/or minimize such vibrations as the fluid, represented by a rotary arrow 70 in FIG. 4A, is squeezed between the elements of the damper sleeve 50 and core 52 while moving within the channel 60. This manner of magneto rheological fluid control is referred to as radial squeeze film damping, and may be effectively utilized in a radial squeeze film damping system, as more fully described below.

Those skilled in the art will appreciate that the damper core 52, built as a solid cylindrical structure, is theoretically configured to be secured as a stationary structure, while the portion of the damper sleeve 50, radially surrounding the central portion 53 of the damper core 52, is configured to bend radially outwardly from the core under vibratory forces. As such, in the disclosed modular machining fixture 10, at least two dimensional damping capability can be provided via the reactive behavior of the magneto rheological fluid 70 within the channel 60; i.e. vertically and laterally. In the disclosed embodiment, the dynamically collapsible channel 60 may have a dimension that ranges from 0.005 to 0.08 inch between the sleeve 50 and the core 52.

The disclosed modular machining fixture 10 has the capability of providing both dynamic and static stiffness for damping workpiece vibrations. The clamps 28, 30 configured to retain the cylindrical dampers 40, 42 to the cradle walls 32, 34, respectively, may be adjusted to increase or decrease static stiffness. As such, the laterally extending bolts 36 are adjustable to provide for desired bending moments on the respective dampers 40, 42 for controlling static stiffness. Conversely, dynamic stiffness control may be simultaneously provided via real-time dynamic reactions of the magneto rheological fluid 70 to changes in viscosity. Finally, it will be apparent that the radial design of the damper allows damping a vibration along multiple axes, and particularly in the more desirable vertical and lateral directions/dimensions. However, additional arrays of such dampers (not shown) may be combined with the disclosed dampers 40, 42 to provide damping even along a longitudinal (i.e. an end-to-end) dimension, if and wherein tooling requirements may dictate.

Figure 5:
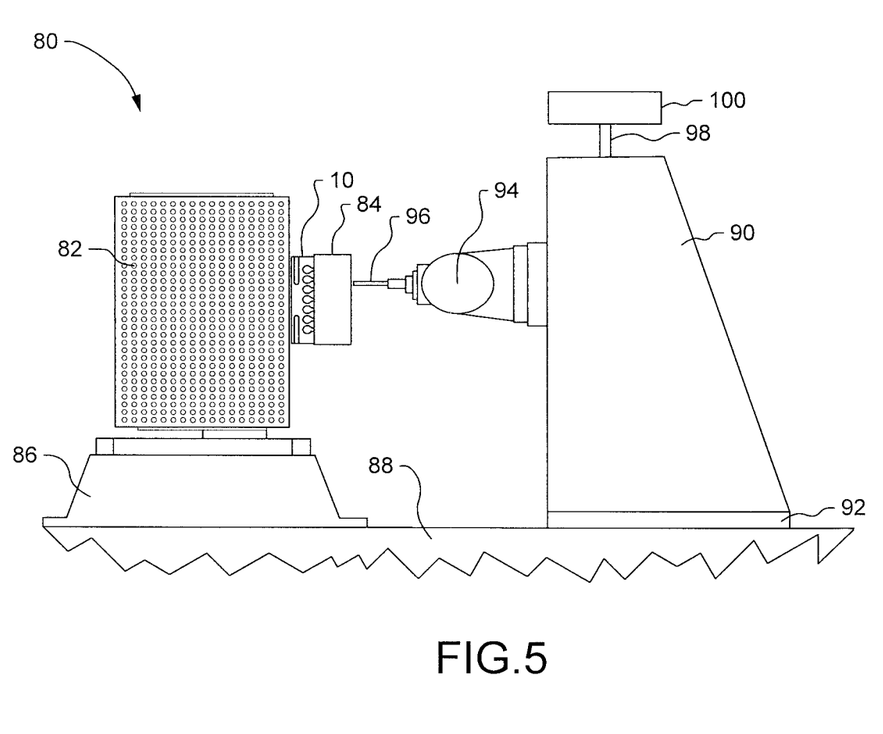
FIG. 5 is an elevational view of an exemplary machine tool configuration utilizing the magneto rheological fixture damping system of the present disclosure.

Referring now to FIG. 5, an exemplary magneto rheological fixture damping system 80 is configured to utilize the earlier described modular machining fixture 10. The system 80 includes a tombstone 82, which may be effectively described as a pedestal-style tooling column. A workpiece 84 is secured to the modular machining fixture 10. The tombstone 82 is supported on a base 86 that may be secured to a fixed structure, such as a floor 88. Cooperatively spaced laterally from the fixture mounted workpiece 84 is a pedestal style machine tool 90 having a base 92 also secured to a fixed structure, such as the floor 88. The machine tool 90 includes a motor 94 which drives a tool 96. Finally, a rigid element 98 supports a machine tool controller 100, by which all aspects of the disclosed real time damping system 80 may be controlled.

Figure 6:
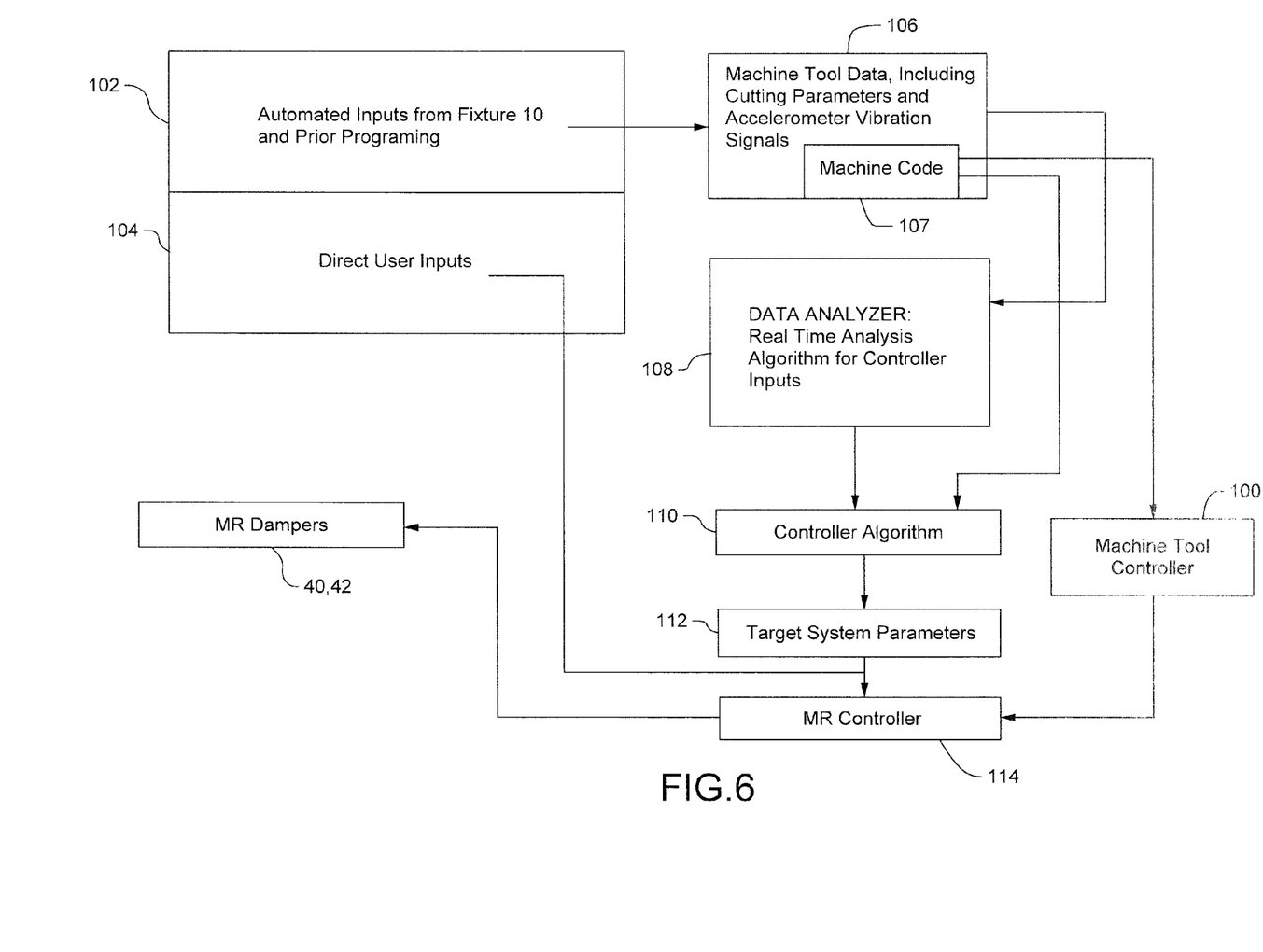
FIG. 6 is a flowchart depicting exemplary functions of a machine tool controller that may be utilized in the magneto rheological fixture damping system of the present disclosure.

Exemplary details of the operation of the machine tool fixture damping system 80 may now be described in reference to the flowchart of FIG. 6, which depicts all fundamental operational interactions as managed by the machine tool controller 100.

During machining of the workpiece 84, all automated vibratory inputs, represented as element 102, received from fixture 10, along with any previously established programming parameters, are fed into a machine tool data bank, represented as element 106. The machine tool data bank 106 represents all cutting parameters along with accelerometer vibration signals. Real-time data from the machine tool data bank 106 is conveyed to a data algorithm analyzer, represented as element 108, which conducts real-time analysis of received data, and feeds the analyzed data into a controller algorithm, depicted as element 110. Predetermined target system parameters, represented as element 112, modulate the data from element 110, and the two sets of data 110 and 112 are fed into a magneto rheological controller 114.

Simultaneously, and in parallel with the foregoing, direct user inputs, shown as element 104, are fed into the magneto rheological controller 114 as well. Finally, any programmed machine code, reflected as element 107, is simultaneously fed into the controller algorithm 110 and to the machine tool controller 100. Both set of data are fed directly into the magneto rheological controller 114, which then directly controls/manages the magneto rheological dampers 40, 42.

It will be apparent that the ability of the squeeze film damping system 80 to accommodate direct user inputs 104 gives rise to the capacity of real time damping throughout the entire machining process. As such, as material is removed from the workpiece 84, the natural frequency and resonance of the physical workpiece 84 changes in real time. This translates into a requirement of more or less damping, and the machine tool controller 100 is able to manage and control in real time, at least via elements 104 and 108, any required amount of damping needed while the workpiece is physically reduced in size during the machining process.

Method:

A method of using the magneto rheological film damper system 80 to provide vibration damping of a workpiece during machining may include filling a radial space between a sleeve and a cylindrical core of a cylindrical magneto rheological radial squeeze film damper with a magneto rheological fluid; securing the damper to a machine tool fixture; securing the assembled fixture and damper to a tombstone; applying a workpiece to the fixture; placing a machine tool adjacent the workpiece, and configuring a controller to manage a predetermined algorithm to control stiffness of the fluid via application and modulation of an electric current across the fluid to control a magnetic field through the fluid in real time during machining of the workpiece via the machine tool.

The method may further include determining and varying the stiffness of the fluid in real time to control vibration damping as a function of reduction of mass of the workpiece.

INDUSTRIAL APPLICABILITY

The disclosed magneto rheological radial squeeze film damper system 80 may provide improved tooling capabilities across a large range of parts, part sizes, machines, and cutting tools. Offering a broad band damping solution, the system 80 is not limited to use of only tuned mass dampers which require physical application and removal of weights during the machining process as natural frequency of the part or workpiece changes. The system 80, on the other hand, utilizes a machine tool controller driven by predetermined algorithms that may be adapted and tailored to provide real-time damping adjustments via simple modulation of electric current or voltage to change intensity of a magnetic field.

As such, the system 80 may provide improved part surface finish, reduced tool chatter and tool machining cycles, as well as reduced workplace environmental hazards created by sole use of tuned mass dampers.

Although only one embodiment may have been depicted or suggested herein, it should be appreciated that the disclosure provided is not intended to be limiting, but intended to be exemplary for purposes of economy and convenience.

What is claimed is:

1. A machining fixture damping system of using rheological fluid to dampen workpiece vibrations during machining, the system comprising:
a machining fixture;
a predetermined algorithm;
a radial squeeze film damper secured to the machining fixture, the radial squeeze film damper containing magneto rheological fluid, wherein the damper is configured to provide damping in at least two dimensions; and
a machine tool controller configured to apply real-time adjustments of a magnetic field through the magneto rheological fluid by modulating an electric current in accordance with the predetermined algorithm to vary dynamic stiffness of the fluid.

2. The machining fixture damping system of claim 1, wherein the predetermined algorithm also controls the dynamic stiffness of the rheological fluid as a function of a reduction in mass of the workpiece during the machining process.

3. The machining fixture damping system of claim 1, wherein the machining fixture further comprises a block for holding a workpiece, and a cradle for supporting the block, wherein the radial squeeze film damper is positioned via a plurality of clamps to secure the damper against the cradle.

4. The machining fixture damping system of claim 3, comprising two radial squeeze film dampers, each rigidly affixed to the cradle, each extending parallel to and spaced apart of the other.

5. The machining fixture damping system of claim 4, wherein the radial squeeze film dampers each include an internal sleeve containing a solid core cylinder, the radial space between the sleeve and core defining a rheological fluid channel.

6. The machining fixture damping system of claim 4, further comprising a base for supporting the cradle, and wherein the plurality of clamps includes a longitudinally spaced pair of end clamps, each end clamp supporting one end of each radial squeeze film damper.

7. The machining fixture damping system of claim 3, further comprising a tombstone configured to support the machining fixture.

8. The machining fixture damping system of claim 1, further comprising a machine tool, wherein the machine tool controller applies the algorithm to control rheological fluid stiffness to reduce machine tool chatter.

9. The machining fixture damping system of claim 1, wherein the algorithm utilizes automated programming inputs and direct user inputs to control rheological fluid stiffness.

10. A machining fixture configured to reduce workpiece vibrations, the machining fixture, comprising:
- a base having a longitudinally extending axis, and longitudinally spaced ends;
- an end clamp secured to each longitudinal spaced end of the base;
- a longitudinally extending cradle affixed to the base between the end clamps;
- a block for holding a workpiece, the block being supported longitudinally and laterally on the cradle; and
- a radial squeeze film damper fixed securely to the cradle.

11. The machining fixture of claim 10, further comprising two radial squeeze film dampers, each rigidly affixed to a laterally spaced side of the cradle, each extending parallel to and spaced laterally apart of the other.

12. The machining fixture of claim 11, wherein each radial squeeze film damper includes an internal sleeve containing a solid core cylinder, the radial space between each sleeve and core defining a rheological fluid channel.

13. The machining fixture of claim 12, wherein the rheological fluid channel between the sleeve and the core has a dimension ranging from 0.005 to 0.02 inch.

14. The machining fixture of claim 11, further comprising a plurality of longitudinally spaced side clamps for securing each radial squeeze film damper to one of the laterally spaced sides of the cradle, and wherein the longitudinally spaced pair of end clamps support longitudinally spaced ends of each radial squeeze film damper.

15. The machining fixture of claim 14, wherein the plurality of longitudinally spaced side clamps comprise two sets of side clamps, one set for each radial squeeze film damper, each set being laterally spaced from the other, each set being longitudinally positioned between the end clamps.

16. The machining fixture of claim 15, wherein each set of side clamps includes adjustable bolts for static damper tuning of each respective radial squeeze film damper.

17. The machining fixture of claim 11, wherein each radial squeeze film damper includes end caps for retaining rheological fluid.

18. The machining fixture of claim 10, wherein the block for holding a workpiece comprises a dovetail block.

19. A method of using a machining fixture film damper system to provide vibration damping of a workpiece during machining; comprising:
- forming a cylindrical magneto rheological radial squeeze film damper to include a cylindrical sleeve having a cylindrical core, and fixing the ends of the cylindrical core to the sleeve;
- filling a radial space between the sleeve and cylindrical core of the cylindrical magneto rheological radial squeeze film damper with a magneto rheological fluid;
- securing the damper to a machine tool fixture;
- securing the assembled machine tool fixture and damper to a tombstone;
- applying a workpiece to the fixture; placing a machine tool adjacent the workpiece; and
- configuring a controller to manage a predetermined algorithm to control stiffness of the magneto rheological fluid via modulation of a voltage to control a magnetic field through the magneto rheological fluid in real time during machining of the workpiece via the machine tool.

20. The method of claim 19, further comprising:
- determining and varying the stiffness of the magneto rheological fluid in real time to control the vibration damping as a function of reduction of mass of the workpiece.

* * * * *